United States Patent

Nakao et al.

[11] 4,025,902
[45] * May 24, 1977

[54] GENERAL PURPOSE SEQUENCE CONTROLLER

[75] Inventors: Hisaji Nakao; Katutoshi Naruse; Kazuhiko Hasegawa, all of Toyota; Sadao Kawade; Yasufumi Tokura, both of Kariya; Kazuo Matsuno, Gifu, all of Japan

[73] Assignee: Toyoda Koki Kabushiki Kaisha, Japan

[*] Notice: The portion of the term of this patent subsequent to Sept. 3, 1991, has been disclaimed.

[22] Filed: June 13, 1974

[21] Appl. No.: 479,039

Related U.S. Application Data

[63] Continuation of Ser. No. 381,622, July 23, 1973, Pat. No. 3,832,696.

[30] Foreign Application Priority Data

July 31, 1972 Japan .............................. 47-76721

[52] U.S. Cl. .......................................... 340/172.5
[51] Int. Cl.² ................... G06F 3/00; G06F 9/06; G06F 15/46
[58] Field of Search ........... 340/172.5; 235/151.11; 178/6.7 R

[56] References Cited

UNITED STATES PATENTS

| | | | |
|---|---|---|---|
| 3,321,704 | 5/1967 | Mann | 324/68 |
| 3,351,912 | 11/1967 | Collom et al. | 340/172.5 |
| 3,566,364 | 2/1971 | Hauck | 340/172.5 |
| 3,686,639 | 8/1972 | Fletcher | 340/172.5 |
| 3,701,113 | 10/1972 | Chace | 340/172.5 |
| 3,731,280 | 5/1973 | Shevlin | 340/172.5 |
| 3,753,243 | 8/1973 | Ricketts, Jr. et al. | 340/172.5 |
| 3,827,030 | 7/1974 | Seipp | 340/172.5 |
| 3,832,696 | 8/1974 | Nakao | 340/172.5 |
| 3,833,887 | 9/1974 | Shevlin | 340/172.5 |
| 3,849,765 | 11/1974 | Hamano | 340/172.5 |

OTHER PUBLICATIONS

Allen-Bradley Co. PMC-1750 Programmable Matrix Controller, Publication SD23, Aug. '72 (Previous Publication 4/71).

*Primary Examiner*—Gareth D. Shaw
*Assistant Examiner*—C. T. Bartz
*Attorney, Agent, or Firm*—Oblon, Fisher, Spivak, McClelland & Maier

[57] ABSTRACT

A general purpose sequence controller wherein a schematic electric circuit diagram comprising a ladder network of circuit lines disposed between two vertical bus lines is changeable and simulated by a special purpose control program. A logic operation circuit comprises first and second circuit means for examining an external input signal in accordance with examine commands of logical AND and OR functions, respectively, first and second memory means for temporarily memorizing the examined results of the first and second circuit means, respectively, third memory means for temporarily memorizing the application of the examine command of the logical OR function, and identifying circuit means for identifying the examined results of the logic operations in accordance with the contents of the first, second and third memory means.

8 Claims, 6 Drawing Figures

GENERAL PURPOSE SEQUENCE CONTROLLER

This is a continuation, of application Ser. No. 381,622, filed July 23, 1973, now U.S. Pat. No. 3,832,696.

BACKGROUND OF THE INVENTION

1. Field of the Invention

The present invention relates in general to the control of operations which occur in a programmed sequence, and more particularly relates to a general purpose sequence controller wherein a schematic electric circuit diagram comprising a ladder network of circuit lines disposed between two vertical bud lines is changeable and simulated by a special purpose control program which is previously applied to the memory device of the controller.

2. Description of the Prior Art

In the conventional programmable sequence controller, a logic operation circuit was provided to make a logic operation of an input condition and to transmit an output corresponding to the satisfaction of the input condition to the external control units of industrial machines such as machine tools. However, since the logic operation circuit was provided with only one memory element for temporarily memorizing the result of a logic operation, a series of examine commands had to be provided and unified in the form of logical AND functions for continuously examining the input conditions therewith. In such a manner examine commands for logical OR functions were logically converted to the form of examine commands of the logical AND function. On the other hand operations being executed by the examine commands of logical AND and OR functions could be given in the form of Boolean Algebra. While somewhat satisfactory, in making an executive program for sequence control in such a manner there was the disadvantage that troublesome logic operations were required and a skillful programmer was needed for developing the programming operations.

Moreover, in the first-mentioned way above, in case a series of examine commands were performed by the combination of a plurality of examine commands, the results of the logic operation executed up until then had to be transferred for memorization in a dummy output circuit during the series of logic operations. Accordingly, the programming of the executive program was made complicated and thereby deceased the effective utilization capacity of the memory device.

Furthermore, in the second-mentioned way, in case the examine commands of logical OR functions of plural groups were connected by the examine commands of logical AND functions, then the executive program was itself made long.

SUMMARY OF THE INVENTION

It is, therefore, an object of the present invention to provide a new and improved unique general purpose sequence controller wherein a schematic electric circuit diagram can be easily simulated by a simple special purpose control program.

Another object of the present invention is to provide a new and improved unique general purpose sequence controller having a logic operation circuit capable of continuously examining an external input signal individually with logical AND and OR functions.

Still another object of the present invention is to provide a new and improved general purpose sequence controller having a logic transferring circuit capable of continuously examining one and other groups of examine commands of logical OR functions which groups are connected to each other by logical AND functions.

Briefly, according to the present invention, these and other objects are achieved by providing a general purpose sequence controller as mentioned below. A memory device memorizes a special purpose control program simulating a schematic electric circuit diagram of a logic sequence. The control program has a train of instructions identified by a memory address thereof. Each of the instructions has an examine command and an address information therein. A logic operation circuit examines an external input signal with the examine command. An input circuit selectively applies the external input signal to the logic operation circuit in accordance with the address information. An output circuit transmits a control signal based on the result of examination of the logic operation circuit. The logic operation circuit further comprises first and second circuits for examining the external input signal with examine commands of the logical AND and OR functions, respectively, first and second memory elements for temporarily memorizing the examined results of the first and second circuits, respectively, a third memory element for temporarily memorizing the application of the examine command of the logical OR function, and an identifying circuit for identifying the examined results of the examine operation in accordance with the contents of the first, second and third memory elements.

BRIEF DESCRIPTION OF THE DRAWINGS

The foregoing and other objects of the present invention will be more fully appreciated as the same becomes better understood from the following detailed description of a preferred embodiment when considered in connection with the accompanying drawings, in which.

DETAILED DESCRIPTION OF THE PREFERRED EMBODIMENT

Figure 1:
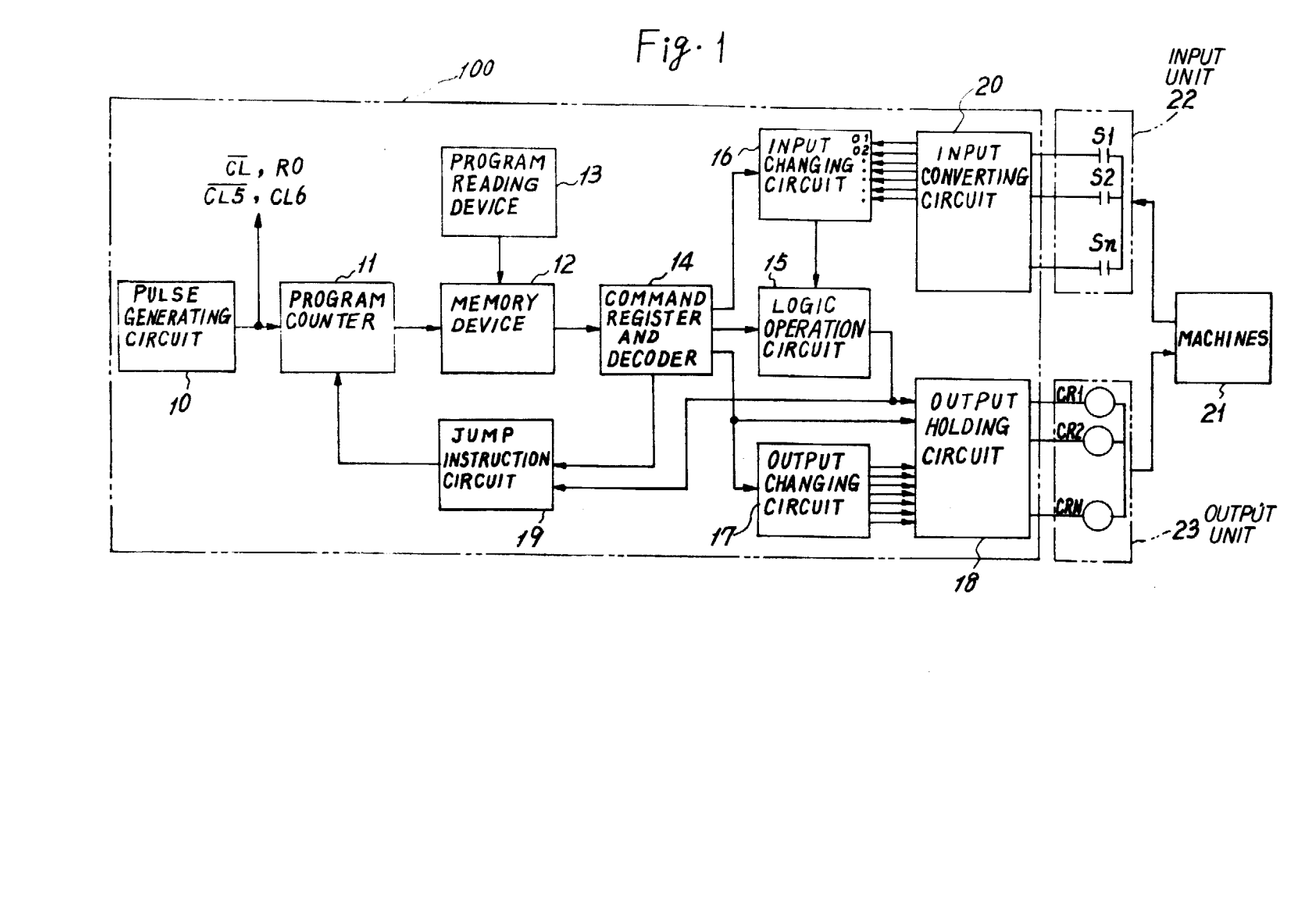
FIG. 1 is a block diagram showing the outline of a programmable controller.
Figure 2:
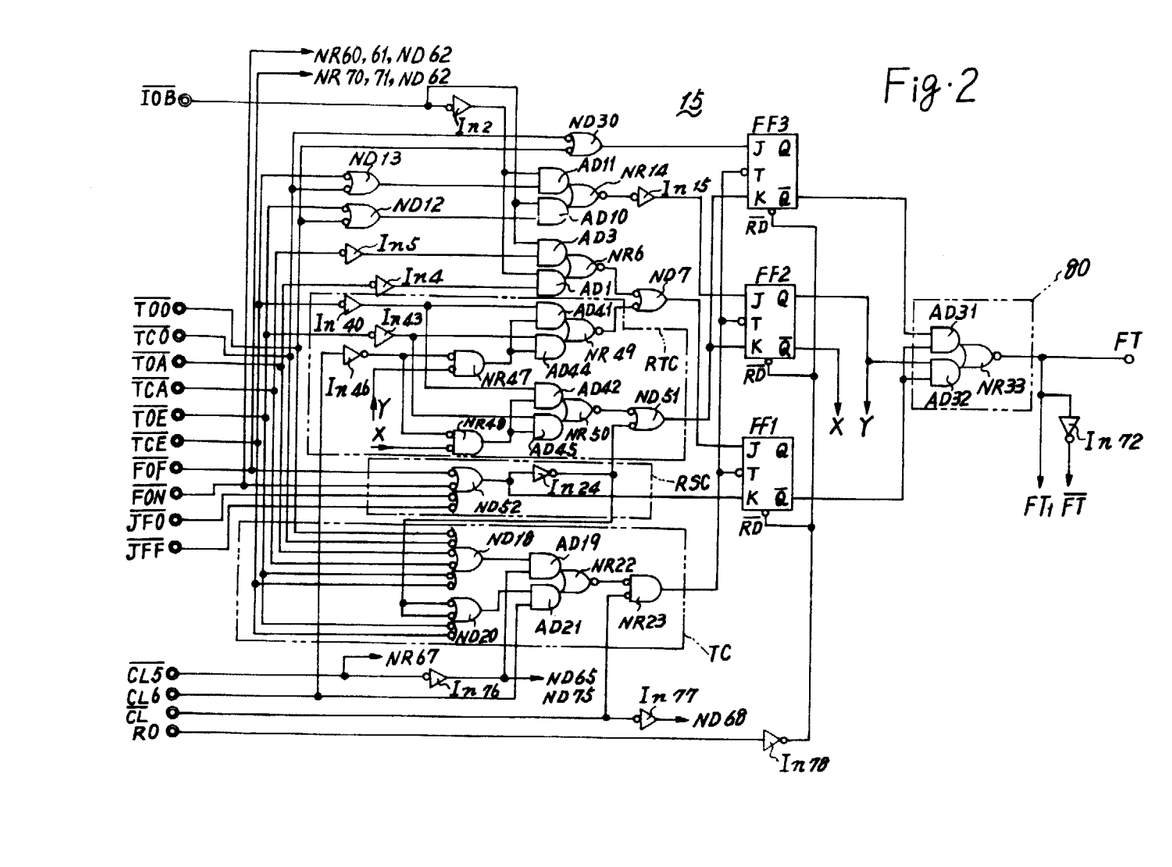
FIG. 2 is a circuit diagram showing one part of a logic operation circuit according to the present invention.

A preferred embodiment of the present invention is described here-in-under with reference to the accompanying drawings, wherein like reference numerals designate identical parts throughout the several views and more particularly to FIG. 1 which shows the outline of a general purpose sequence controller 100 and FIG. 2 which shows in part a logic operation circuit 15 according to the present invention.

In FIG. 1, a conventional clock pulse generating circuit 10 includes a crystal oscillator and a pulse distributor for generating a plurality of pulse trains individually having high constant frequencies. One of the pulse trains from the clock pulse generating circuit 10 is transmitted to a conventional program counter 11. The content of the program counter 11 is increased by one each time a clock pulse is applied thereto and is transmitted in binary code to a conventional memory device 12 such as a read-write magnetic core memory. An instruction which is held in a memory location or address instructed by the program counter 11 is fed to a conventional command register and decoder 14. The memory addresses are sequentially counted unless a jump instruction in the program specifies a deviation from the sequence.

Figure 5:
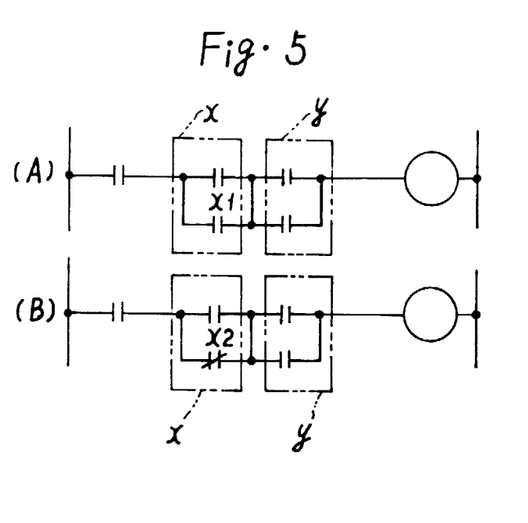
FIG. 5 is a circuit diagram showing a model of the contacts and connections of an electrical ladder circuit.

In the preferred embodiment, a schematic electrical circuit diagram comprising a ladder network of circuit lines disposed between two vertical bus lines, for example as fragmentally shown in FIG. 5, is programmed as shown in the table below.

TABLE

| Memory Address | Instruction Examine Command | Operand |
|---|---|---|
| 0001 | TCA | 01 (S1) |
| 0002 | TCO | 02 (S2) |
| 0003 | TCO | 03 (X1) |
| : | : | : |
| 0015 | JFO | 0030 |
| : | | |

The instructions are directly entered in order into the core memory by pressing the appropriate buttons on the programming panel of a conventional program reading device 13. With reference to the ladder diagram of FIG. 5, the TCA command of 0001 memory address means to examine by logical AND function whether the input at the input terminal 01 of a conventional input converting circuit 20 is in the ON-state. When the switch S1 is closed in the movement of a construction element of a machine tool 21, an input 1 appears at the input terminal 01 corresponding to the switch S1. The TCO command of 0002 memory address means to examine by logical OR function whether the input of the input terminal 02 is in the ON-state. Similarly, the TCO command of 0003 memory address means to examine by logical OR function whether the input at the input terminal 03 is in the ON-state, thus whether the switch X1 is closed. Although the circuit diagram corresponding to the JFO command of 0015 memory address is not shown in FIG. 5, the JFO command is described hereinafter with reference to the block diagram of FIG. 1.

The command register and decoder 14 temporarily stores the program which is transmitted from the memory device 12. Also in the command register and decoder 14, the program is distinguished into commands of every kind. The input address command is transmitted to a conventional input-changing circuit 16 by which an input signal from the input-converting circuit 20 is forwarded to a unique logic operation circuit 15 only when the input signal appears at the input terminal corresponding to the input address command. The examine and the output address commands are transmitted to the logic operation circuit 15 and a conventional output-changing circuit 17. The output command is transmitted to a conventional output holding circuit 18. Furthermore, the command register and decoder 14 outputs JFO and JFF jump commands to a conventional jump instruction circuit 19 in accordance with the condition of the examined result of the logic operation circuit 15. The jump instruction circuit 19 sets the program counter 11 in accordance with the memory address instructed in the operand. In the program table, for example, the JFO command of 0015 memory address means to cause the program counter 11 to count the following memory address 0016 if the operation results at that time satisy the logic condition of the examine command and also to cause the program counter 11 to jump and count the memory address instructed in the operand if the operation results at that time do not satisfy the logic condition of the examine command. The input-converting circuit 20 converts external open-close signals of a conventional input unit 22 having contacts S1 to Sn, inclusive, such as high alternating or direct current voltage signals to low direct current voltage signals adequate for the controller 100. The converted signals of contacts S1 to Sn are applied to the input terminals 01, 02, . . . of the input-changing circuit 16, respectively.

Upon the receipt of an examine command signal, the logic operation circuit 15 provides a logic operation for the input signal which is transmitted from the input-changing circuit 16 in accordance with the input address command. The result of the logic operation is applied to the output holding circuit 18 which comprises a plurality of output flip-flop circuits (not shown) corresponding to solenoid or the like relays CR1 to CRN, inclusive, of a conventional output unit 23. One flip-flop circuit which is instructed by the output-changing circuit 17 is operated by the result of the operation or the output command to thereby energize or deenergize the relay corresponding thereto. The operation of the relay controls a machine tool 21.

In this programmable controller, the program information which is stored in the memory device 12 is read out at a considerably high speed (e.g. 7 micro seconds per one word) by the program counter 11 for transmission to the logic operation circuit 15, the input-changing circuit 16, the output-changing circuit 17 and the output-holding circuit 18. When the input condition accords with the sequence information then applied, the signal instructing the execution of the sequence information is applied to the output unit 23, thus logically controlling the machine tool 21 in accordance therewith.

Referring now to FIG. 2, a part of a logic operation circuit 15 is shown as having a terminal $\overline{IOB}$ which is connected to the input-changing circuit 16 for receiving an input signal of a negative or low voltage state from the same. The input signal is transmitted to one input terminal of an AND gate AD3 and to one input terminal of an AND gate AD1 through an inverter In2. The other input terminal of the AND gate AD1 is connected to a terminal $\overline{TOA}$ through an inverter In4. The signal applied to a terminal $\overline{TCA}$ is transmitted to the other input terminal of the AND gate AD3 through an inverter In5.

Examine commands of every kind can be transmitted from the command register and decoder 14 to the terminals $\overline{TOO}, \overline{TCO}, \overline{TOA}, \overline{TCA}, \overline{TOE}, \overline{TCE}, \overline{FOF}, \overline{FON}, \overline{JFO}$ and $\overline{JFF}$ of the logic operation circuit 15. When the examine command is applied to any one of the terminals, a negative or low voltage signal appears at the terminal. Then, the remaining terminals are in the positive or high voltage state. The signals which are based upon commands to examine whether an input is applied to the terminal $\overline{IOB}$ under the condition of a logical AND function or not (hereinafter called TCA command, TOA command) are applied to the terminals $\overline{TCA}$ and $\overline{TOA}$ from a time $t3$ in the command-executing time T to the next time $t3$, as shown in the (A) of FIG. 3.

If the TOA command of the executive program is applied to the terminal $\overline{TOA}$ and the input condition is satisfied, then the negative input will not appear at the terminal $\overline{IOB}$. The positive input signal is applied to the other terminal of the AND gate AD1 through the inverter In4, while the negative input signal is applied to one input terminal of the AND gate AD1 through the inverter In2. Therefore, the AND gate AD1 is kept closed or non-conductive. Also, in the TCA command of the executive program if the negative input is applied to the terminal $\overline{IOB}$ from the input changing circuit 16, i.e. the input condition is satisfied, then the AND gate AD3 is kept closed or non-conductive. The non-conductive signals of the AND gates AD1 and AD3 are applied to the J-terminal of a first J—K flip-flop circuit FF1 as a signal of low voltage level through a NOR gate NR6 and a NAND gate ND7. The J–K flip-flop circuit FF1 is kept in a reset state by the signal of low voltage level even when a trigger signal is applied to the T-terminal thereof from a trigger circuit TC, described hereinafter, during the time $t5a$ of FIG. 3. Thus, the flip-flop circuit FF1 memorizes in the state of reset thereof that the operation result of logical AND function is satisfied, while the state of set thereof memorizes that the operation result of logical AND function is not satisfied.

The terminal $\overline{IOB}$ is further connected directly to one input terminal of an AND gate AD10 and indirectly to one input terminal of an AND gate AD11 through the inverter In2. The other input terminal of the AND gate AD10 is connected to the output terminal of a NAND gate ND13, which has input terminals thereof connected to the terminals $\overline{TOO}$ and $\overline{TOE}$. The other input terminal of the AND gate AD11 is connected to the output terminal of a NAND gate ND13, which has input terminals thereof connected to the terminals $\overline{TCO}$ and $\overline{TCE}$. The signals which are based upon commands to examine whether the input is applied to the terminal $\overline{IOB}$ under the condition of a logical OR function or not (hereinafter called $\overline{TCO}$ command, $\overline{TOO}$ command) are applied to the terminals $\overline{TCO}$ and $\overline{TOO}$ from the time $t3$ in the command-executing time T to the next time $t3$, as shown in the (A) of FIG. 3.

When the input condition of the $\overline{TOO}$ or $\overline{TCO}$ command is satisfied in the executive program, the AND gate AD10 or AD11 is opened through the NAND gate ND12 or ND13 so that a conductive signal therefrom may be applied to the J-terminal of a second J–K flip-flop circuit FF2 as a signal of a high voltage level through a NOR gate NR14 and an inverter In15. Therefore, the J–K flip-flop circuit FF2 is kept in a set state by the signal of high voltage level when the trigger signal is applied to the T-terminal thereof and then the high voltage level signal is applied to the J-terminal. Thus, the second flip-flop circuit FF2 is adapted to memorize in the set state thereof that the operation result of the logical OR function is satisfied, while when the operation result of the logical OR function is not satisfied the same is memorized in the reset state of the flip-flop circuit FF2.

The aforementioned trigger circuit TC which transmits trigger pulses to the T-terminals of the first, second and third J–K flip-flop circuits FF1, FF2 and FF3 comprise gate elements as described hereunder.

A 6-input NAND gate ND18 has its input terminals connected to the terminals $\overline{TOO}$, $\overline{TCO}$, $\overline{TOA}$, $\overline{TCA}$, $\overline{TOE}$ and $\overline{TCE}$. The output terminal of the NAND gate ND18 is connected to one input terminal of an AND gate AD19. The other input terminal of the AND gate AD19 is connected to a terminal $\overline{CL5}$ through an inverter In76 and receives clock pulses, as shown in the (B) of FIG. 3. The input terminals of a 4-input NAND gate ND20 are connected to the terminals $\overline{TOE}$ and $\overline{TCE}$ and to the output terminal of an inverter In24 of a reset circuit RSC described hereinafter. The NAND gate ND20 is connected at its output terminal to one input terminal of an AND gate AD21. The other input terminal of the AND gate AD21 is connected to a terminal CL6 to receive clock pulses, as shown in the (C) of FIG. 3. The output terminals of AND gates AD19 and AD21 are connected to the input terminals of a NOR gate NR22. The output terminal of the NOR gate NR22 is connected to one input terminal of a NOR gate NR23. The other input terminal of the NOR gate NR23 is connected to a terminal $\overline{CL}$ to receive clock pulses, as shown in the (D) of FIG. 3. Thus, the trigger circuit TC transmits a trigger signal from the NOR gate NR23 to the terminals of the flip-flop circuits at the time $t5a$ in one command-executing time T when a signal is applied to the NAND gate ND18 from any one of the terminals $\overline{TOO}$, $\overline{TCO}$, $\overline{TOA}$, $\overline{TCA}$, $\overline{TOE}$ and $\overline{TCE}$. Also, the trigger circuit TC transmits a trigger signal from the NOR gate NR23 at the time $t6a$ in one command-executing time T when a signal is applied to the NAND gate ND20 from any one of the terminals $\overline{TOE}$ and $\overline{TCE}$ and the inverter In24.

The terminals $\overline{TOO}$ and $\overline{TCO}$ are connected to the input terminals of a NAND circuit ND30. The output terminal of the NAND circuit ND30 is connected to the J-terminal of the third J–K flip-flop circuit FF3. The third flip-flop circuit FF3 is adapted to memorize in the set state thereof that the examine command of the logical OR function has been executed. The third flip-flop circuit FF3 is reset when the $\overline{TOO}$ or $\overline{TCO}$ command is applied to the J-terminal through a NAND gate ND30 and the trigger pulse is applied to the T-terminal. The reset output terminal of the third flip-flop circuit FF3 is connected to one input terminal of an AND gate AD31. The other input terminal of the AND gate AD31 is connected to the reset output terminal of the first flip-flop circuit FF1. The set output terminal of the second flip-flop circuit FF2 is connected to one input terminal of an AND gate AD32. The other input terminal of the AND gate AD32 is connected to the reset output terminal of the first flip-flop circuit FF1 and to the other input terminal of the AND gate AD31. The output terminals of the AND gates AD31 and AD32 are connected to the input terminals of a NOR circuit NR33. Thus, an identifying circuit 30 is constituted by the NOR gate NR33 and the AND gates AD31 and AD32. The output terminal of the NOR gate NR33 is connected to terminals FT and FT1 and to a terminal $\overline{FT}$ through an inverter In72.

The AND gate AD31 is opened when the input condition is satisfied in the examine command program of the logical AND function. The AND gate AD32 is opened when the input condition is satisfied in the examine command program of the logical OR function. In either case, the NOR gate NR33 transmits a signal of a low voltage level to the output terminal FT to instruct the satisfaction of the input condition. On the contrary, a signal of a high voltage level is transmitted to the output terminal FT which is connected to the output holding circuit 18, when the input condition is not satisfied. Thus, the examined results are applied to the output terminal FT in accordance with the states of the first, second and third flip-flop circuits FF1, FF2 and FF3. Even in case the conditions of the examine commands of the logical OR function are rendered over a plurality of steps, the results of the examining which have been executed at that time need not be memorized at a dummy output circuit, whereby the examine program is made simple and the memory device can be efficiently used.

Further in the logic operation circuit 15, a logic transferring circuit RTC is provided and is operable in case a group of logical OR function commands x and another group of logical OR function commands y are connected to each other by the condition of the logical AND function, as shown in the connection model of the ladder electric circuit (A), (B) of FIG. 5. The logic transferring circuit RTC is constituted by gate elements as described hereunder.

The terminal $\overline{TCE}$ is connected to the input terminals of AND gates AD41 and AD42 through an inverter In40. The terminal $\overline{TOE}$ is connected to the input terminals of AND gates AD44 and AD45 through an inverter In43. The terminal CL6 is connected to the input terminals of NOR gates NR47 and NR48 through an inverter In46 so that the clock pulses of the (C) of FIG. 3 may be applied to the input terminals. The other input terminal of the NOR gate NR47 is connected to the setting output terminal of the flip-flop circuit FF2. The output terminal of the NOR gate NR48 is connected to the other input terminals of the AND gates AD42 and AD45. The other input terminals of the NOR gate NR48 is connected to the reset output terminal of the flip-flop circuit FF2. The output terminal of the NOR gate NR47 is connected to the other input terminals of the AND gates AD41 and AD44. The output terminals of the AND gates AD41 and AD44 are connected to the input terminals of a NOR gate NR49. The output terminal of the NOR gate NR49 is connected to the input terminal of the NAND gate ND7. The output terminals of the AND gates AD42 and AD45 are connected to the input terminals of a NOR gate NR50. The output of the NOR gate NR50 is connected to the input terminal of a NAND gate ND51. The other input terminal of the NAND gate ND51 is connected to the output terminal of the inverter In24 of the reset circuit RSC. The output terminal of the NAND gate ND51 is connected to the K-terminals of the second and third flip-flop circuits FF2 and FF3.

The reset circuit RSC comprises the inverter In24 and a 4-input NAND gate ND52. The output terminal of the NAND gate ND52 is connected to the input terminal of the inverter In24 and the K-terminal of the first flip-flop circuit FF1. The input terminals of the NAND gate ND52 are connected to the terminals, $\overline{FOF}$, $\overline{FON}$, $\overline{JFO}$ and $\overline{JFF}$.

The terminal $\overline{TCE}$ is adapted to receive a signal which is based on the examine command of the logical OR function of a normally open contact X1 of the ladder electrical circuit shown in the (A) of FIG. 5. The examine command (TCE command) instructs to examine whether an input is applied to the terminal $\overline{IOB}$ under the final condition of a group of logical OR functions at the time shown in the (A) of FIG. 3. On the other hand, the terminal $\overline{TOE}$ is adapted to receive a signal which is based on the examine command of the logical OR function of a normally closed contact X2 of the ladder electrical circuit shown in the (B) of FIG. 5. The examine command (TOE command) instructs to examine whether an input is not applied to the terminal $\overline{IOB}$ under the final condition of a group of the logical OR functions at the time shown in the (A) of FIG. 3.

Figure 3:
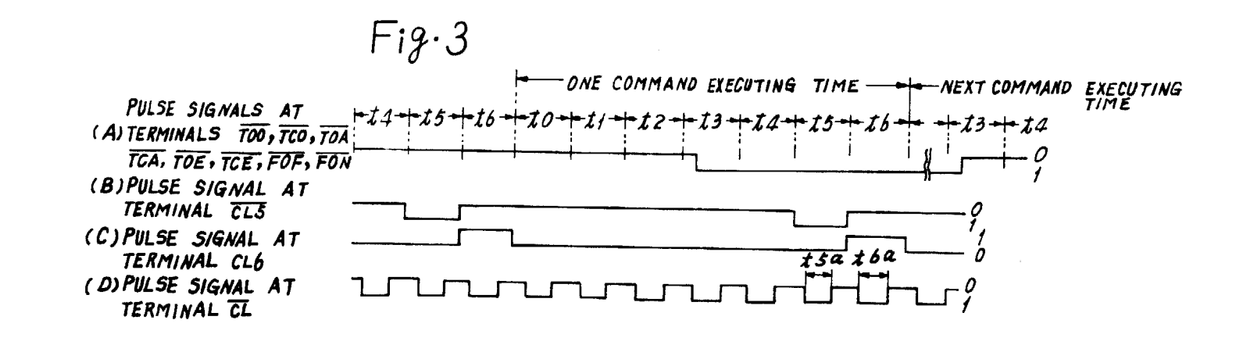
FIG. 3 is a schematic view showing waveforms of pulse signals applied to the logic operation circuit in one command-executing time.
Figure 4:
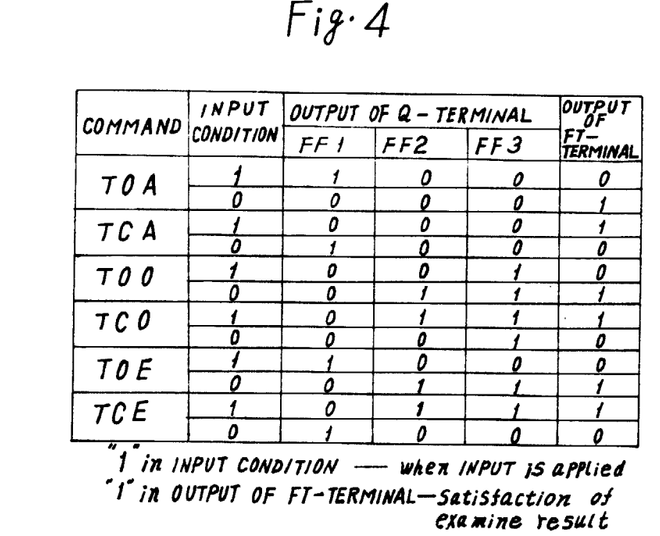
FIG. 4 is a schematic table showing the relationship between each examine command applied to the circuit of FIG. 2 and outputs thereof.

If the TCE command of the executive program is applied to the terminal $\overline{TCE}$ and the input condition is satisfied, then an input signal of a negative or low voltage level is applied to the terminal $\overline{IOB}$. The negative input is inverted to a positive input by the inverter In2 and then applied to one input terminal of the AND gate AD11. Also, the signal of negative or low voltage level of the TCE command is applied to the terminal $\overline{TCE}$ and in turn to the input terminal of the NAND gate ND13, whereby the positive signal is applied also to the other input terminal AD11. Thus, when any one of the input conditions is satisfied in the TCE or TOE command of the executive programming the AND gate AD11 or AD10 is opened to thereby set the second flip-flop circuit FF2 at the time t5a in the T-time. Then, the K-terminals of the second and third flip-flop circuits receive a signal of high voltage level, since the output of the NOR gate NR48 is applied to the other input terminals of the AND gates AD42 and AD45 at the time t5. The flip-flop circuits FF2 and FF3 are reset by trigger signals which are applied to the T-terminals from the trigger circuit TC at the time t6a, as shown in FIG. 3, and are kept in the reset state for subsequent examine commands (y shown in FIG. 5) of other groups of logical OR functions.

On the contrary, when the input condition is not satisfied in the TCE or TOE command, of the executive program, the AND gates AD10 and AD11 are not opened to thereby keep the second flip-flop circuit FF2 reset as it is. The second flip-flop circuit FF2 has been reset by the examined result of the TOO or TCO command which has been executed before. Therefor, the NOR gate NR47 transmits its output signal of positive or high voltage level at the time t6 to the J-terminal of the first flip-flop circuit FF1 which is in turn set by the trigger signal at the time t6a.

As mentioned above, in case a group of examine commands of the logic OR function and another group of examine commands of the logic OR function are connected to each other by the condition of a logic AND function, then the satisfaction of the final examine command of the logic OR function in the group makes the second and third flip-flop circuits FF2 and FF3 reset and wait for subsequent groups of commands of the logic OR function. On the other hand, when the final command of the logic OR function in the group is not satisfied, the first flip-flop circuit FF1 is set to thereby apply the signal of negative or low voltage level, designating the unsatisfaction of the result of the logical examination, to the output terminal $\overline{FT}$.

Figure 6:
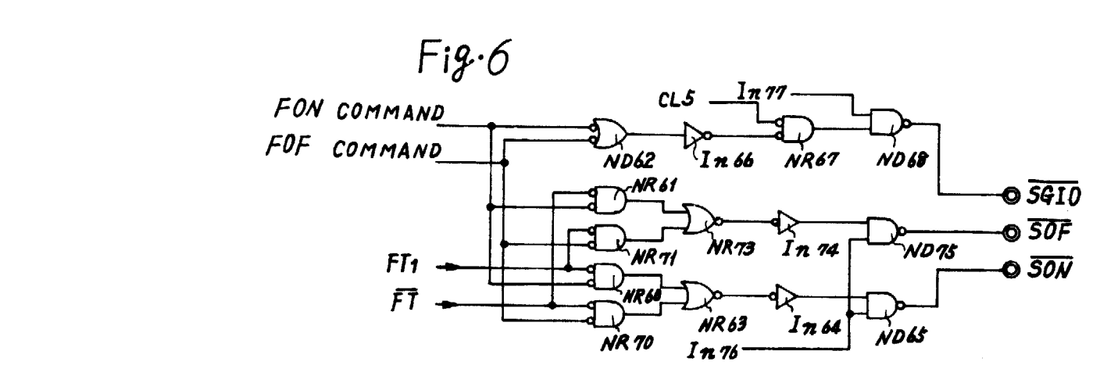
FIG. 6 is a circuit diagram shwing the other part of the logic operation circuit.

The output signals which are transmitted from the identifying circuit 80 in accordance with the examined result of the circuit of FIG. 2 are applied to the circuit of FIG. 6 to execute a simple program. The terminal $\overline{FON}$, FIG. 2, is connected to the input terminals of NOR gates NR60 and NR61 and a NAND gate ND62, in FIG. 6 to transmit a FON command to the same after the abovementioned examine command. The FON command instructs to make the output of the logic operation circuit 15 in the ON-state when the examined result is satisfied and on the contrary to make the output in the OFF-state when the examined result is not satisfied. The other input terminal of the NOR gate NR60 is connected to the NOR gate NR33 of the identifying circuit 80. The NOR gate NR60 is connected to an output terminal $\overline{SON}$ through a NOR gate NR63, an inverter In64 and a NAND gate ND65. The output terminal $\overline{SON}$ is connected to the J-terminal of a plurality of output flip-flop circuits (not shown) which are contained in the output holding circuit 18. The output terminal of the NAND gate ND62 is connected to an output terminal $\overline{SGIO}$ through an inverter In66, a NOR gate NR67 and a NAND gate ND68. The other input terminal of the NOR gate NR67 is connected to the terminal $\overline{CL5}$. The terminal $\overline{CL}$ is connected to the other input terminal of the NAND gate ND68 through an inverter In77. The output terminal $\overline{SGIO}$ is connected to the T-terminals of the above-identified output flip-flop circuits through gate circuits (not shown) which are selected by the output changing circuit 17.

When the examined result has been satisfied under the application of the FON command, the signals of low voltage level appear at the terminal $\overline{SON}$ at the time $t5$ and at the terminal $\overline{SGIO}$ at the time $t5a$. Then, the output flip-flop circuit which is instructed by the address command in the FON command is set to thereby transmit the output based on the examined result to the corresponding relay, solenoid or the like of the output unit 23.

The terminal $\overline{FOF}$ is connected to the input terminals of the NAND gate ND62 and NOR gates NR70 and NR71 to transmit the FOF command signal applied thereto to the same. The FON command instructs to make the output of the logic operation circuit 15 in the ON-state (low voltage level) when the examined result is not satisfied and on the contrary to make the output in the OFF-state (high voltage level) when the examined result is satisfied. The input terminals of NOR gates NR61 and NR70 are connected to the terminal $\overline{FT}$ which is connected to the identifying circuit 80 through the inverter In72. The terminal FT1 of the identifying circuit 80 is connected to the input terminals of the NOR gates NR60 and NR71. The output terminals of the NOR gates NR61 and NR71 are connected to a terminal $\overline{SOF}$ through an inverter In74 and a NAND gate ND75. The other input terminals of the NAND gates ND65 and ND75 are connected to the terminal $\overline{CL5}$ through the inverter In76. The terminal $\overline{SOF}$ is connected to the K-terminals of the output flip-flop circuits in the output holding circuit 18.

When the examined result is satisfied under the application of the FOF command, the signals of low voltate level appear at the terminal $\overline{SOF}$ at the time $t5$ and at the terminal $\overline{SGIO}$ at the time $t5a$. Then, the output flip-flop circuit which is instructed by the address command in the FON command is reset to thereby transmit the output based on the examined result to the output unit 23.

Furthermore, when the examined result is not satisfied under the application of the FON command, the signal of low voltage level appears at the terminal $\overline{SOF}$. When the examined result is not satisfied under the application of the FOF command, the signal of low voltage level appears at the terminal $\overline{SON}$. Thus, the circuit shown in FIG. 6 is adapted to accomplish the output operation based on the examined result of the command by only rendering the FON or FOF command of one word after the examine command, whereby the program is made simple.

Obviously, numerous modifications and variations of the present invention are possible in light of the above teaching. It is therefore to be understood that within the scope of the teaching herein and the appended claims the invention may be practical otherwise than as specifically described herein.

What is claimed as new and desired to be secured by letters patent of the United States is:

1. A programmable sequence controller comprising:
    first memory means for memorizing a sequence program comprising a train of instructions, each instruction including an examine command and address information;
    input circuit means operatively connected to a plurality of addressed external input devices for converting states of the external input devices into logical values;
    output circuit means operatively connected to a plurality of addressed external output devices to be energized or deenergized;
    a logic operation circuit operatively connected to the input and output circuit means;
    reading means operatively connected to the first memory means, the input and output circuit means and the logic operation circuit for reading out the train of instructions memorized in the first memory means and applying an examine command to the logic operation circuit and address information to one of the input and output circuit means to specify one of the external input and output devices;
    the logic operation circuit comprising:
    first gate means operatively connected to the input circuit means and the reading means for comparing a logical value of the external input device specified by address information with a condition specified by an examine command for a logical AND function;
    second memory means operatively connected to the first gate means for memorizing a comparison result of the first gate means;
    second gate means operatively connected to the input circuit means and the reading means for comparing a logical value of the external input device specified by address information with a condition specified by an examine command for a logical OR function;
    third memory means operatively connected to the second gate means for memorizing a comparison result of the second gate means; and
    identifying circuit means operatively connected to the second and third memory means for identifying the comparison results of the first and second gate means in accordance with the contents of the second and third memory means;
    the output circuit means being operatively connected to the identifying circuit means and operable to energize or deenergize one of the addressed external output devices in response to an output of the identifying circuit means in the logic operation circuit.

2. A programmable sequence controller according to claim 1, wherein
    the first gate means comprises a first AND gate operatively connected to the input circuit means and the reading means for generating an output when a logical value of the external input device specified by address information meets a condition specified by a first examine command to examine whether an input device for a logical AND function is in an ON state, and a second AND gate operatively connected to the input circuit means and the reading means for generating an output when a logical value of the external input device specified by address information meets a condition specified by a second examine command to examine whether an input device for a logical AND function is in an OFF state;

the second memory means comprises a first flip flop operatively connected to the first and second AND gates to be set when none of the first and second AND gates generates an output and to be reset when one of the first and second AND gates generates an output;

the second gate means comprises a third AND gate operatively connected to the input circuit means and the reading means for generating an output when a logical value of the external input device specified by address information meets a condition specified by a third examine command to examine whether an input device for a logical OR function is in an ON state, and a fourth NAND gate operatively connected to the input circuit means and the reading means for generating an output when a logical value of the external input device specified by address information meets a condition specified by a fourth examine command to examine whether an input device for a logical OR function is in an OFF state; and the third memory means comprises a second flip flop operatively connected to the third and fourth AND gates to be set when one of the third and fourth AND gates generates an output and to be reset when none of the third and fourth AND gates generates an output.

3. A programmable sequence controller comprising:

first memory means for memorizing a sequence program comprising a train of instructions, each instruction including an examine command and address information;

input circuit means operatively connected to a plurality of addressed external input devices for converting states of the external input devices into logical values;

output circuit means operatively connected to a plurality of addressed external output devices to be energized or deenergized;

a logic operation circuit operatively connected to the input and output circuit means;

reading means operatively connected to the first memory means, the input and output circuit means and the logic operation circuit for reading out the train of instructions memorized in the first memory means and applying an examine command to the logic operation circuit and address information to one of the input and output circuit means to specify one of the external input and output devices;

the logic operation circuit comprising:

first gate means operatively connected to the input circuit means and the reading meas for comparing a logical value of the external input device specified by address information with a condition specified by an examine command for a logical AND function;

second memory means operatively connected to the first gate means for memorizing a comparison result of the first gate means;

second gate means operatively connected to the input circuit means and the reading means for comparing a logical value of the external input device specified by address information with a condition specified by an examine command for a logical OR function;

third memory means operatively connected to the second gate means for memorizing a comparison result of the second gate means; and a logic transfer circuit operatively connected to the second and third memory means for transferring the content of the third memory means to the second memory means at the end of a comparison of a logical value with the final examine command among a group of successively read out examine commands for a logical OR function;

the output circuit means being operatively connected to the logic transfer circuit and operable to energize or deenergize one of the addressed external output devices in response to an output of the second memory means in the logic operation circuit.

4. A programmable sequence controller according to claim 3, wherein the first gate means comprises a first AND gate operatively connected to the input circuit means and the reading means for generating an output when a logical value of the external input device specified by address information meets a condition specified by a first examine command to examine whether an input device for a logical AND function is in an ON state, and a second AND gate operatively connected to the input circuit means and the reading means for generating an output when a logical value of the external input device specified by address information meets a condition specified by a second examine command to examine whether an input device for a logical AND function is in an OFF state;

the second memory means comprises a first flip flop operatively connected to the first and second AND gates to be set when none of the first and second AND gates generates an output and to be reset when one of the first and second AND gates generates an output;

the second gate means comprises a third AND gate operatively connected to the input circuit means and the reading means for generating an output when a logical value of the external input device specified by address information meets a condition specified by a third examine command to examine whether an input device for a logical OR function is in an ON state, and a fourth AND gate operatively connected to the input circuit means and the reading means for generating an output when a logical value of the external input device specified by address information meets a condition specified by a fourth examine command to examine whether an input device for a logical OR function is in an OFF state;

the third memory means comprises a second flip flop operatively connected to the third and fourth AND gates to be set when one of the third and fourth AND gates generates an output and to be reset when none of the third and fourth AND gates generates an output;

the logic transfer circuit comprises a first circuit for causing the second flip flop to be reset at the end of a comparison of a logical value with the final examine command among a group of successively read out third or fourth examine commands for a logical OR function when the second flip flop has been set and a second circuit for causing the first flip flop to be set at the end of a comparison of a logical value with the final examine command among a group of successively read out third or fourth examine commands for a logical OR function when the second flip flop has been reset; and the output circuit means being operable to energize or deenergize one of the addressed external output devices in response to an output from a reset output terminal of the first flip flop.

5. A programmable sequence controller comprising:

first memory means for memorizing a sequence program comprising a train of instructions, each instruction including an examine command and address information;

input circuit means operatively connected to a plurality of addressed external input devices for converting states of the external input devices into logical values;

output circuit means operatively connected to a plurality of addressed external output devices to be energized or deenergized;

a logic operation circuit operatively connected to the input and output circuit means;

reading means operatively connected to the first memory means, the input and output circuit means and the logic operation circuit for reading out the train of instructions memorized in the first memory means and applying an examine command to the logic operation circuit and address information to one of the input and output circuit means to specify one of the external input and output devices;

the logic operation circuit comprising:

first gate means operatively connected to the input circuit means and the reading means for comparing a logical value of the external input device specified by address information with a condition specified by an examine command for a logical AND function;

second memory means operatively connected to the first gate means for memorizing a comparison result of the first gate means;

second gate means operatively connected to the input circuit means and the reading means for comparing a logical value of the external input device specified by address information with a condition specified by an examine command for a logical OR function;

third memory means operatively connected to the second gate means for memorizing a comparison result of the second gate means;

fourth memory means operatively connected to the reading means for memorizing an application of the examine command for a logical OR function; and identifying circuit means operatively connected to the second, third and fourth memory means for identifying the comparison results of the first and second gate means in accordance with the contents of the second, third and fourth memory means; and the output circuit means being operatively connected to the identifying circuit means and operable to energize or deenergize one of the addressed external output devices in response to an output of the identifying circuit means in the logic operation circuit.

6. A programmable sequence controller according to claim 5, wherein the first gate means comprises a first AND gate operatively connected to the input circuit means and the reading means for generating an output when a logical value of the external input device specified by address information meets a condition specified by a first examine command to examine whether an input device for a logical AND function is in an ON state, and a second AND gate operatively connected to the input circuit means and the reading means for generating an output when a logical value of the external input device specified by address information meets a condition specified by a second examine command to examine whether an input device for a logical AND function is in an OFF state;

the second memory means comprises a first flip flop operatively connected to the first and second AND gates to be set when none of the first and second AND gates generates an output and to be reset when one of the first and second AND gates generates an output;

the second gate means comprises a third AND gate operatively connected to the input circuit means and the reading means for generating an output when a logical value of the external input device specified by address information meets a condition specified by a third examine command to examine whether an input device for a logical OR function is in an ON state, and a fourth AND gate operatively connected to the input circuit means and the reading means for generating an output when a logical value of the external input device specified by address information meets a condition specified by a fourth examine command to examine whether an input device for a logical OR function is in an OFF state;

the third memory means comprises a second flip flop operatively connected to the third and fourth AND gates to be set when one of the third and fourth AND gates generates an output and to be reset when none of the third and fourth AND gates generates an output;

the fourth memory means comprises a third flip flop operatively connected to the reading means to be set when one of the third and fourth examine commands is applied;

the identifying circuit means comprises a fifth AND gate operatively connected to reset output terminals of the first and third flip flops and a sixth AND gate operatively connected to a reset output terminal of the first flip flop and to a set output terminal of the second flip flop; and the output circuit means being operable to energize or deenergize one of the addressed external output devices in response to outputs of the fifth and sixth AND gates.

7. A programmable sequence controller according to claim 6, wherein the logic operation circuit further comprises a logic transfer circuit operatively connected to the first and second flip flops for transferring the content of the second flip flop to the first flip flop at the end of comparison of a logical value with the final examine command among a group of successively read out third or fourth examine commands.

8. A programmable sequence controller according to claim 7, wherein the logic transfer circuit comprises a first circuit for causing the second and third flip flops to be reset at the end of comparison of a logical value with the final examine command among a group of successively read out third or fourth examine commands for a logical OR function when the second flip flop has been set and a second circuit for causing the first flip flop to be set at the end of comparison of a logical value with the final examine command among a group of successively read out third or fourth examine commands for a logical OR function when the second flip flop has been reset.

* * * * *